Feb. 9, 1937.  A. H. MITTAG  2,070,446
THYRATRON INVERTER STABILIZER
Filed Sept. 29, 1934
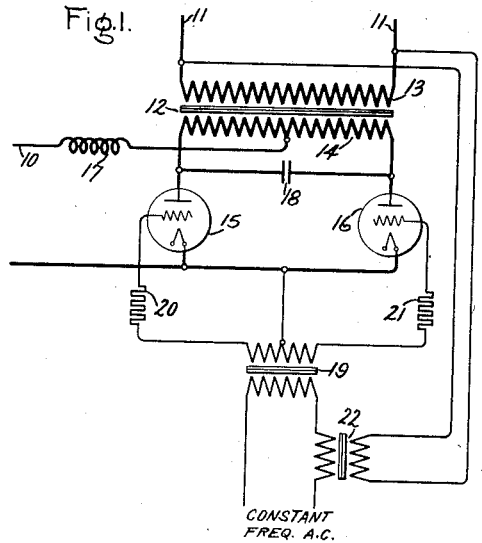
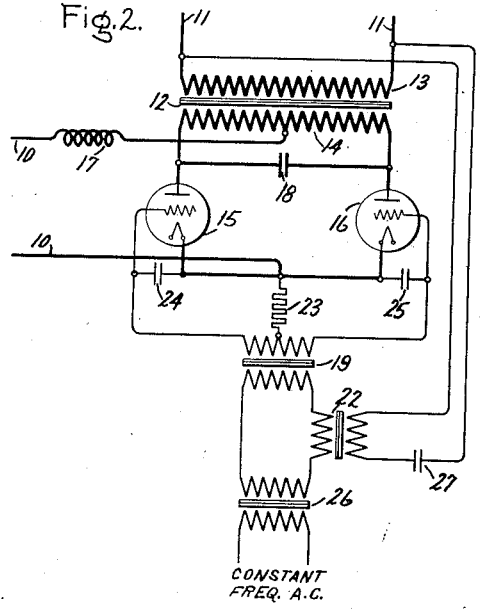
Inventor:
Albert H. Mittag,
by Harry E. Dunham
His Attorney.

Patented Feb. 9, 1937

2,070,446

UNITED STATES PATENT OFFICE 2,070,446

THYRATRON INVERTER STABILIZER

Albert H. Mittag, Schenectady, N. Y., assignor to General Electric Company, a corporation of New York Application September 29, 1934, Serial No. 746,151

4 Claims. (Cl. 175—363)

My invention relates to electric valve converting apparatus and more particularly to such apparatus used for transmitting energy from a direct current supply circuit to an alternating current load circuit.

In the use of electric valve converting apparatus in which grid controlled vapor electric valves are used, it is customary to determine the instant at which the valve is rendered conductive by impressing a periodically pulsating potential upon the grid or control element. In the case of the regeneratively excited inverter, a portion of the output has served as a source of energy for the excitation of the grid or control circuit. Generally it is more common to energize the grid or control circuit from a separate source of alternating or pulsating potential. Where the grid circuit of an inverter has been energized only from a separate source of alternating or pulsating potential, it has been found that there is a tendency for the output power of the inverter to vary to some extent, and this variation is particularly objectionable when an inverter is utilized to supply power to a synchronous clock circuit.

It is an object of my invention, therefore, to provide an improved excitation circuit for an electric valve inverter which will overcome the above mentioned disadvantages of the arrangements of the prior art and which will be simple and reliable in operation.

It is a further object of my invention to provide an improved excitation circuit for the control elements of an electric valve inverter which will maintain the output thereof constant.

In accordance with one embodiment of my invention, an excitation circuit for the control elements of an electric valve inverter is energized from the output circuit of the inverter and from a source of constant frequency alternating current such as would be obtainable from an oscillator or frequency control inverter.

For a better understanding of my invention together with other and further objects thereof, reference may be had to the following description taken in connection with the accompanying drawing in which Fig. 1 represents one embodiment of my invention and Fig. 2 represents a preferred embodiment of my invention.

The novel features which I believe to be characteristic of my invention are set forth with particularity in the appended claims.

Referring more particularly to Fig. 1 of the drawing, there is illustrated an arrangement embodying my invention for transmitting energy from a direct current circuit 10 to a single phase alternating current circuit 11. This arrangement includes a transformer 12 having a secondary winding 13 connected to the output circuit 11 and a primary winding 14 provided with an electrical midpoint connected to the positive side of a direct current circuit 10 and with end terminals connected to the negative side of a direct current circuit through the electric valves 15 and 16. A current smoothing reactor 17 is preferably included in the direct current circuit as illustrated. In order to provide a source of electromotive force for commutating the current between the valves 15 and 16, a commutating capacitor 18 is preferably connected across the winding 14. However, this particular electric translating circuit thus far described forms no part of my present invention, but is an arrangement well known in the art. The electric valves 15 and 16 are each provided with an anode, a cathode and a control element and may be any of the types well known in the art, but are preferably of the vapor electric type in which the starting of current in the valves may be controlled by the potential impressed upon its grid, but in which the current in the valves can be interrupted normally only by means of the external circuit.

In order to render electric valves 15 and 16 successively conductive to transmit alternating current to the circuit 11, the control elements thereof are excited from a pair of secondary windings of the grid transformer 19, the primary winding of which is energized from any suitable source of alternating potential of a frequency which it is desired to supply the circuit 11. Each of the control circuits of the electric valves 15 and 16 includes a current limiting resistor 20 and 21. If desired, the control circuit of the electric valves may also include negative biasing means (not illustrated) which may be any one of the forms well known in the art. The grid or control transformer 19 is energized from a circuit connected to the primary winding thereof and which includes the secondary winding of a transformer 22 and connections to a source of constant frequency alternating current. The primary winding of the transformer 22 is energized from the alternating current output circuit 11.

As is well understood by those skilled in the art, the inverter disclosed in Fig. 1 would be completely operative to supply alternating current to the circuit 11 if the terminals leading to the source of constant frequency alternating current were instead connected to a static capacitor. Furthermore, the circuit also would be operative if the grids of the valves 15 and 16 were excited only from energy derived from the source of constant frequency alternating current. As has been stated, however, the latter arrangement would have the disadvantage that the output appearing across the circuit 11 would vary in power. It has been found in accordance with my invention that if a small portion of the output energy were to be introduced into the circuit which energizes the grids of the valves by means of the transformer 22 the alternating current power output appearing across the circuit 11 will be substantially constant.

The general principles of operation of the above described translating circuit for transmitting energy from the direct current circuit 10 to the alternating current circuit 11 will be well understood by those skilled in the art. In brief, if one of the electric valves, for example, valve 15 is initially rendered conductive, current will flow through the left-hand portion of the winding 14 and generate one-half cycle of alternating current in the circuit 11. During this interval the capacitor will become charged with such a polarity that when, substantially 180 electrical degrees later, electric valve 16 is rendered conductive, capacitor 18 will be effective to commutate the current from the valve 15 to the valve 16. As the current flows through the right-hand portion of the winding 14 and the valve 16, a half cycle of alternating current of opposite polarity will be supplied to the circuit 11. In this manner the current is successively commutated between the valves 15 and 16 and alternating current is supplied to the circuit 11 of a frequency equal to that of a source of potential impressed upon the control transformer 19.

The potential impressed upon the grids of the valves 15 and 16 by means of the control transformer 19 determines the instant of ignition or flow of current through each of the valves. In order to maintain a substantially constant voltage output across the alternating current circuit 11, a portion of the energy from this circuit is impressed upon the control transformer 19 by means of the transformer 22. This introduction of a portion of the output voltage into the voltage which is supplied to the grid control transformer 19 produces a stabilizing action which maintains the output voltage substantially constant.

As is well known by those skilled in the art it is necessary in the absence of relatively complicated commutating means to provide a grid excitation voltage which leads the anode voltage in order to obtain inverter operation. Therefore, if in Fig. 1 the only source of grid voltage were that obtained from the constant frequency alternating current source this voltage would have such a phase relation with respect to the output voltage that it would lead the output voltage by a few degrees. It has been found, however, in the operation of such an arrangement that this phase relation between the grid voltage and the output voltage which is denoted by the angle of grid advance is not a constant relationship. In other words, it appears that this angle increases and decreases with changes in the output voltage. It is believed that if this variation in the angle of grid advance were eliminated that the output of the inverter would be constant and hence it is desirable to provide some arrangement to retard or compensate for the variation in the angle of the grid advance. Accordingly, I have obtained this compensation by the introduction into the grid excitation circuit of a component of the output voltage. The transformer ratio of the transformer 22 is so chosen that the resultant of this component with the component derived from the constant frequency alternating current source is such as to maintain a substantially constant angle of grid advance. Thus when the output of the inverter tends to increase this component of the voltage introduced into the grid excitation circuit tends to change the resultant voltage applied to the grid so as to maintain the proper phase relation between the grid voltage and the output voltage.

While I do not wish to be limited thereto, I believe that the above explanation presents in accordance with present knowledge the most likely theory of operation of the circuit arrangement disclosed herein.

Referring more particularly to Fig. 2, components of the apparatus disclosed therein which are identical to the apparatus of Fig. 1, have like reference characters. In this arrangement the current limiting resistors 20 and 21 have been combined into a single resistor 23 and capacitors 24 and 25 have been connected between the control electrode and the cathode of the valves 15 and 16, respectively, to improve the operation thereof. The use of these capacitors is disclosed in the Howard Patent No. 1,965,416, issued July 3, 1934. In order to prevent the current of constant frequency alternating current from being affected by the grid circuit, or the output circuit, a transformer 26 may be connected between the source of constant frequency alternating current and the link circuit which is connected to the transformers 19 and 22. It has also been found advantageous to introduce a phase shift by means of capacitor 27 connected to the primary winding of the transformer 22, between the voltage of the output circuit 11 and the voltage impressed upon the transformer 22.

It will thus be apparent to those skilled in the art that I have provided an electric valve inverter which will supply alternating current at a frequency which is constant and which will produce a substantially constant power output due to the stabilizing action of the energy introduced into the grid circuit from the output circuit.

While I have shown and described my invention in connection with certain specific embodiments, it will, of course, be understood that I do not wish to be limited thereto, since it is apparent that the principles herein disclosed are susceptible of numerous other applications, and modifications may be made in the circuit arrangement and in the instrumentalities employed without departing from the spirit and scope of my invention as set forth in the appended claims.

What I claim as new and desire to secure by Letters Patent of the United States is:

1. In an electric translating circuit the combination of a direct current supply circuit, an alternating current output circuit, an electric valve inverter for transmitting energy therebetween, said inverter including a plurality of electric valves provided with control elements and symmetrical control circuits, a source of constant frequency alternating current of relatively low power output, and means for energizing said control circuits with energy derived partly from said output circuit and principally from said source of alternating current, said combined energy producing a component having a substantially constant phase relation with respect to said output voltage.

2. The combination of a source of direct current, an inductive winding and a plurality of electric valves connected thereto, said electric valves each being provided with a control element, an output circuit including a secondary inductive winding coupled to said first winding, a source of constant frequency alternating current of relatively low power output, and a control circuit for said control elements connected to receive a small portion of its energy from said output circuit and the remainder of its energy from said source of alternating current, said energy being so proportioned as to maintain the output of said valves substantially constant.

3. In combination, a direct current supply circuit, an electric valve inverter, an output circuit therefor, said inverter including a plurality of electric valves each provided with a control electrode and a control circuit therefor, a source of constant frequency alternating current of relatively low power output, means for deriving a potential from said output circuit which has a predetermined phase relation thereto, and means for energizing said control circuits from said last-mentioned means and said source of alternating current, in such proportion as to maintain said inverter output substantially constant.

4. The combination of a source of direct current, an inductive winding and a plurality of electric valves connected across said source, a commutating capacitor connected across said winding, a control element and a control circuit for each of said valves, an output circuit coupled to said inductive winding, a source of constant frequency alternating current of relatively low power output, and means interconnecting said low power source, said output circuit and said control circuits to supply to said control elements energies combined in such proportion as to maintain the output of said valves substantially constant.

ALBERT H. MITTAG.